United States Patent [19]

Rooney et al.

[11] Patent Number: 4,525,553
[45] Date of Patent: Jun. 25, 1985

[54] ACRYLIC POLYMERIZATION CATALYSTS CONTAINING FERRICENIUM SALTS

[75] Inventors: John M. Rooney, Naas; Paul Conway, Cobh, both of Ireland

[73] Assignee: Loctite (Ireland) Limited, Dublin, Ireland

[21] Appl. No.: 581,857

[22] Filed: Feb. 21, 1984

[51] Int. Cl.$^3$ .................................................. C08F 4/82
[52] U.S. Cl. .................................... 526/120; 526/131; 526/135; 526/171
[58] Field of Search ................ 526/120, 131, 135, 171

[56] References Cited

U.S. PATENT DOCUMENTS

| 2,922,805 | 1/1960 | Kaufman | 526/171 |
| 3,855,040 | 12/1974 | Malofsky | 428/451 |
| 4,076,742 | 2/1978 | Berlin et al. | 526/313 |

*Primary Examiner*—Paul R. Michl
*Attorney, Agent, or Firm*—Walter J. Steinkraus

[57] ABSTRACT

Ferricenium salts of the formula:

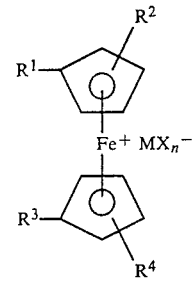

where $R^1$, $R^2$, $R^3$ and $R^4$ are the same or different H or alkyl groups or a linkage to a polymeric backbone: M is a metal or metalloid; X is a halide and n is an integer, induce polymerization of acrylic monomer/peroxy initiator systems. Above a certain minimum concentration, however, gel time of the composition increases with additional ferricenium salt. This property is especially useful for controlling pot life of an activated acrylic composition.

10 Claims, No Drawings

ACRYLIC POLYMERIZATION CATALYSTS CONTAINING FERRICENIUM SALTS

BACKGROUND OF THE INVENTION

The present invention pertains to acrylic monomer/peroxy initiator compositions which utilize certain ferricenium salts as novel activators.

As used herein, the term acrylic monomers refers to compounds having groups of the formula

where R is H or alkyl.

In U.S. Pat. No. 3,753,927, there are described promoter systems for peroxide cured unsaturated polyester resins which include certain ferrocene compounds having carbonyl containing substituents.

In U.S. Pat. No. 3,855,040 to Malofsky, it is disclosed that combinations of a ferrocene compound, a strong acid and a peroxy compound are effective initiators of acrylic monomer compositions.

In U.S. Pat. No. 4,076,742, anaerobic compositions utilizing an oligocarbonateacrylate, benzoyl peroxide, ferrocene and a specified inhibitor are described.

SUMMARY OF THE INVENTION

It has now been found that ferricenium salts of the formula

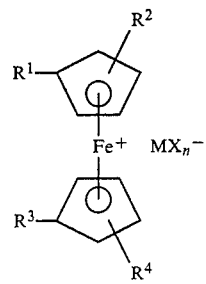

where $R^1$, $R^2$, $R^3$ and $R^4$ are the same or different H or alkyl groups or a linkage to a polymer backbone as in poly(vinyl ferrocene); M is a metal or metalloid; X is a halide; and n is an integer, induce polymerization of acrylic monomer/peroxy initiator systems. Above a certain minimum concentration, however, gel time of the composition increases with additional ferricenium salt. This property is especially useful for controlling pot-life of an activated acrylic monomer composition. The ferricenium salt may be added directly or generated in situ.

An aspect of the invention is a novel curable composition comprising: (a) an acrylic monomer; (b) a peroxy initiator; and, (c) a ferricenium salt of formula 2.

A further aspect of the invention is a method of making the inventive compositions by generating the ferricenium salt in situ by addition of a trityl salt to a composition of monomer, a peroxy initiator and a ferrocene compound.

DETAILED DESCRIPTION OF THE INVENTION

Specific examples of the acrylic monomers utilizable in the inventive compositions include the acrylic esters as described in columns 3 and 4 of U.S. Pat. No. 3,855,040, the entire disclosure of which is incorporated herein by reference, methacrylate functional urethane block copolymers such as described in U.S. Pat. No. 4,309,526, also incorporated herein by reference, and acrylic functional silicone resins.

Examples of peroxy initiators usable in the inventive compositions include the peroxy compounds mentioned at columns 4 and 5 of U.S. Pat. No. 3,855,040. Preferred peroxy compounds are organic hydroperoxides, such as cumene hydroperoxide. The peroxy initiators are recommended to be used at levels between about 0.1% and 10% by weight, preferably between about 0.5% and 5% by weight.

Ferricenium salts may be derived from the ferrocene or alkyl substituted ferrocenes such as n-butyl ferrocene, t-octyl ferrocene 1,1'-dibutyl ferrocene, and poly(vinyl ferrocene). A variety of methods for generating ferricenium salts from ferrocenes are known in the art. The preferred method of generation is to add a trityl salt, such as triphenyl hexachloroantimonate, to a composition of monomer, peroxyinitiator and a ferrocene. Both trityl salts and ferrocenes are readily available commercially and both are generally easier to disolve in acrylic monomers than the corresponding ferricenium salt.

The counter ions of ferricenium salts have the formula $MX_n^-$ where M denotes an atom of a metal or metalloid selected from antimony, phosphorus, boron, arsenic, tin, or bismuth; X is a halide, preferably fluorine or chlorine; and n is an integer equal to 1 + the valency of M. Examples of such complex anions include $BF_4^-$, $PF_6^-$, $AsF_6^-$, $SbF_6^-$, $SnCl_5^-$, $SbCl_4^-$, $SbCl_6^-$, etc.

The invention is illustrated by the following nonlimiting examples.

EXAMPLE 1

A formulation was prepared consisting of 100.0 grams of triethylene glycol dimethacrylate, 2.0 grams of cumene hydroperoxide and 1.0 gram of ferrocene. Equal amounts (3.5 grams) of the formulation were poured into five 12 mm × 75 mm pyrex test tubes. Varying amounts (as shown in Table I) of triphenyl carbenium hexachloroantimonate were added to each of the test tubes and the induction time before gellation occurred was measured. The results are shown in Table I.

TABLE I

| Amount of Triphenyl Carbenium Hexachlroantimonate Added, g | Induction Time Before Gellation, Minutes |
| --- | --- |
| 0.001 | 4 |
| 0.002 | 11 |
| 0.003 | 17 |
| 0.004 | 19 |
| 0.005 | 30 |

At the end of the rapid gellation the material in the test tube had formed a solid, insoluble mass.

EXAMPLE 2

A formulation was prepared consisting of 100.0 grams of triethylene glycol dimethacrylate, 2.0 grams of cumene hydroperoxide, and 1.25 grams of n-butyl ferrocene. Equal amounts of the formulation (3.5 grams) were poured into three 12 mm × 75 mm pyrex test tubes. Varying amounts (as shown in Table II) of triphenyl carbenium hexachloroantimonate were added to each of the test tubes and the induction time before gellation occurred was measured. The results are shown in Table II.

TABLE II

| Amount of Triphenyl Carbenium Hexachloroantimonate Added, g | Induction Time Before Gellation, Minutes |
|---|---|
| 0.001 | 1–3 days |
| 0.005 | 5 |
| 0.01 | 50 |
| 0.025 | 50 |
| 0.05 | 50 |
| 0.1 | 50 |

At the end of the rapid gellation, the material in the test tube had formed a solid, insoluble mass.

EXAMPLE 3

A formulation was prepared consisting of 10.0 grams of hydroxypropyl methacrylate; 36.06 grams of a mixture of two related urethane-acrylate resins comprising: (i) a polymerizable block copolymer prepared by first reacting a flexible polymeric methylene ether diol with a molar excess of diisocyanate such as a toluene diisocyanate so that the product had an —NCO group at each end of the diol, the product of the reaction being reacted with a molar equivalence of hydroxyalkyl methacrylate to form a flexible dimethacrylate block copolymer as disclosed in Baccei, U.S. Pat. No. 4,309,526, and (ii) a urethane-acrylate resin of the type disclosed in U.S. Pat. No. 3,425,988; 0.46 grams of ferrocene; 0.05 grams of 2,6-di-tert-butyl-4-methyl phenol; 0.015 grams of tetrasodium ethylenediamine tetraacetate and 1.0 gram of cumene hydroperoxide. This formulation was poured in equal amounts (3.5 grams) into four 12 mm×75 mm pyrex test tubes and varying amounts (as shown in Table III) of triphenyl carbenium hexachloroantimonate were added to each test tube.

Pairs of mild steel grit blasted lapshears, 2 centimeters wide, were coated on one face with the formulations outlined above. The coated surfaces of each pair were firmly placed in contact to give a 0.5 inch overlap in the length direction of the lapshears for an adhesive bond to develop. The bonds were left for 24 hours at room temperature to cure. The bond strengths were measured in the tensile shear mode, using conventional tensile testing equipment. The results are summarized in Table III.

TABLE III

| Amount of triphenyl Carbenium Hexachloroantimonate Added, g | Average Tensile Shear Strength, DaN/cm2 |
|---|---|
| 0.0005 | 91 |
| 0.001 | 55 |
| 0.01 | 61 |
| 0.02 | 17 |

The results show that improved bond strengths are obtained with lower levels of triphenyl carbenium hexachloroantimonate.

EXAMPLE 4

A formulation was prepared consisting of 100.0 grams of polyethylene glycol dimethacrylate (the dimethacrylate ester of polyethylene glycol of molecular weight 200), and 2.0 grams of cumene hydroperoxide. This formulation will be referred to as Formulation A. To 3.5 grams of Formulation A in a 12 mm×75 mm pyrex test tube was added 0.003 grams of ferricenium hexachloroantimonate. Fifteen minutes after the addition, an increase in the viscosity of the formulation was observed. After 20 minutes had elapsed from the time of addition, the formulation had gelled. To 3.5 grams of Formulation A in a 12 mm×75 mm pyrex test tube was added 0.030 grams of an equimolar mixture of ferricenium tetrachloroantimonate and ferricenium hexachloroantimonate. Gellation started after 30 minutes and was complete in 60 minutes.

EXAMPLE 5

A formulation was prepared consisting of 50 grams of tetraethylene glycol dimethacrylate, 50 grams of hydroxypropyl methacrylate and 2 grams of cumene hydroperoxide. This formulation will be referred to as Formulation B. To 3.5 grams of formulation B in a 12 mm×75 mm pyrex test tube was added 0.003 grams of an equimolar mixture of ferricenium tetrachloroantimonate and fericenium hexachloroantimonate. The formulation gelled in slightly under 10 minutes. To 3.5 grams of Formulation B in a 12 mm×75 mm pyrex test tube was added 0.030 grams of an equimolar mixture of ferricenium tetrachloroantimonate and ferricenium hexachloroantimonate. A soft gel formed in 60 minutes.

We claim:

1. A curable composition comprising
   (a) an acrylic monomer;
   (b) a peroxy initiator; and
   (c) a ferricenium salt represented by the formula:

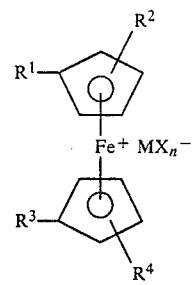

where $R^1$, $R^2$, $R^3$ and $R^4$ are the same or different H or alkyl groups or a linkage to a polymeric backbone, M is a metal or metalloid; X is a halide and n is an integer equal to 1+the valency of M.

2. A composition as in claim 1 formed by addition of a trityl salt to a composition comprising an acrylic monomer, a peroxy initiator and a ferrocene.

3. A composition as in claim 1 wherein M is selected from arsenic, antimony, phosphorus, boron, tin or bismuth.

4. A composition as in claim 1 wherein X is fluorine or chlorine.

5. A composition as in claim 3 wherein $MX^-$ is selected from $BF_4^-$, $PF_6^-$, $AsF_6^-$, $SbF_6^-$, $SnCl_5^-$, $SbCl_4^-$, and $SbCl_6^-$.

6. A composition as in claim 5 wherein $MX_n^-$ is $SbCl_6^-$, $SbCl_4^-$ or mixture thereof.

7. A composition as in claim 1 wherein the ferricenium salt is a salt of ferrocene, n-butyl ferrocene, t-octyl ferrocene, 1,1-dibutyl ferrocene or poly(vinyl ferrocene).

8. A method of formulating a composition as in claim 1 comprising adding a trityl salt to a composition comprising an acrylic monomer, a peroxy initiator and a ferrocene.

9. A method as in claim 8 wherein the trityl salt is triphenyl carbenium hexachloroantimonate.

10. A method as in claim 8 wherein the ferrocene is selected from ferrocene and n-butyl ferrocene.

* * * * *